United States Patent [19]
Itou et al.

[11] Patent Number: 5,907,449
[45] Date of Patent: May 25, 1999

[54] POSITION SUNSITIVITY ADJUSTING METHOD FOR DISK APPARATUS AND A DISK APPARATUS USING THE SAME

[75] Inventors: Kenji Itou; Isamu Tomita; Nobuyuki Suzuki, all of Kawasaki, Japan

[73] Assignee: Fujitsu Limited, Kawasaki, Japan

[21] Appl. No.: 08/823,083

[22] Filed: Mar. 24, 1997

[30] Foreign Application Priority Data

Jul. 10, 1996 [JP] Japan ................................. 8-180232

[51] Int. Cl.[6] .................................................. G11B 5/596
[52] U.S. Cl. ........................................ 360/78.04; 360/67
[58] Field of Search ........................... 360/65, 66, 77.07, 360/77.04, 78.07, 78.04, 75, 67; 369/44.28, 32, 44.29

[56] References Cited

U.S. PATENT DOCUMENTS

| | | | |
|---|---|---|---|
| 4,890,172 | 12/1989 | Watt et al. | 360/77.04 |
| 4,982,297 | 1/1991 | Tsujisawa | 360/77.04 |
| 5,089,757 | 2/1992 | Wilson | 360/77.04 |
| 5,241,433 | 8/1993 | Anderson et al. | 360/77.04 |
| 5,339,206 | 8/1994 | Takahashi | 360/77.08 |
| 5,404,255 | 4/1995 | Kobayashi et al. | 360/77.04 |
| 5,550,685 | 8/1996 | Drouin | 360/77.04 |
| 5,561,568 | 10/1996 | Kisaka | 360/77.08 |
| 5,592,347 | 1/1997 | Mori et al. | 360/77.08 |
| 5,608,588 | 3/1997 | Kisaka | 360/77.08 |

*Primary Examiner*—Nabil Hindi
*Attorney, Agent, or Firm*—Greer, Burns & Crain, Ltd.

[57] ABSTRACT

A position sensitivity adjusting method for a disk apparatus and a disk apparatus using the same for adjusting an AGC (Automatic Gain Control) amplifier for amplifying a servo signal on a servo surface of a disk medium, involves positioning a servo head at a boundary of tracks on the servo surface. The method then includes setting a plurality of different adjustment values in the AGC amplifier, reading two position signals through the servo head for each adjustment value, and calculating a dispersion value of the position signals for each adjustment value. After the adjustment value for the AGC amplifier which provides the minimum dispersion value is acquired from the calculated dispersion values, the acquired adjustment value is set in the AGC amplifier. With the adjusting method, even when offset compensation for positioning the servo head at a track boundary is executed, a positioning error can be prevented.

15 Claims, 13 Drawing Sheets

POS N

POS Q

POSITION SUNSITIVITY ADJUSTING METHOD FOR DISK APPARATUS AND A DISK APPARATUS USING THE SAME

BACKGROUND OF THE INVENTION

1. Field of the Invention

The present invention relates to a position sensitivity adjusting method which is used for a disk apparatus and a disk apparatus using the same for positioning its heads in accordance with a servo signal on a servo surface of a disk medium and adjusts the adjustment value of an AGC (Automatic Gain Control) amplifier for acquiring the servo signal.

2. Description of the Related Art

In magnetic disk apparatuses, the track density of magnetic disks is increased to increase the memory capacity. While magnetic disks have a high track density, it is still necessary to precisely position a head to a target track. This positioning is accomplished by a servo control system.

According to the servo control system, a magnetic disk is provided with a servo surface where a servo signal is written. In accordance with this servo signal from the servo surface, the on-track control of a data head on a data surface is performed.

Even with the use of such a servo control system using the servo surface, when the ambient temperature varies, the degree of expansion/contraction differs from one magnetic disk to another. Even when servo control is executed, therefore, the data head is likely to come off the target track. To prevent this thermal off-tracking, the off-track (offset) amount of the data head is measured every given time. At the time of servo control, the offset amount is added to the control amount to execute the on-track control of the data head. This processing is called offset compensation.

FIG. 10 is a structural diagram of prior art, and FIG. 11 is an explanatory diagram for a servo signal in the prior art.

As shown in FIG. 10, two magnetic disks 90 are spun by a spindle motor 91. Of the four sides of the two magnetic disks 90, the three sides are used as data surfaces 90-1 and one side as a servo surface 90-2. A servo signal is written on the servo surface 90-2. Provided at the data surfaces 90-1 are magnetic heads (data heads) 92-1 which read and write data from and on the respective data surfaces 90-1. Provided at the servo surface 90-2 is a magnetic head (servo head) 92-2 which reads data from the servo surface 90-2.

A rotary actuator (voice coil motor) 93 moves those magnetic heads 92-1 and 92-2 in the radial direction of the magnetic disks 90 and positions the magnetic heads. An AGC (Automatic Gain Control) amplifier 94 performs automatic gain control of signals read by the servo head 92-2 to control the signal levels to a constant level.

A demodulator 95 demodulates the output of the AGC amplifier 94 to two position signals POSN and POSQ having a phase difference of 90 degrees. As shown in FIG. 11, the two position signals POSN and POSQ are sinusoidal waves having a phase difference of 90 degrees.

A controller 96 is constituted of a processor. An adder 97 adds a control amount from the controller 96 to a control amount from the demodulator 95 to control the reference value of the AGC amplifier 94.

The positioning operation of this magnetic disk apparatus is performed as follows. When receiving a seek command from a high-rank apparatus, the controller 96 executes coarse control. That is, the controller 96 generates a speed curve according to the number of tracks to the target track. Then, the controller 96 calculates the actual speed from the position signals POSN and POSQ. The controller 96 obtains a speed error or a speed difference between the target speed on the speed curve and the actual speed. Based on this speed error, the controller 96 controls the rotary actuator 93.

The controller 96 detects the head position from the position signals POSN and POSQ. When detecting that the head has reached near the target position, the controller 96 switches the control to fine control. Then, the controller 96 generates a fine control signal Fine POS as shown in FIG. 11 from the position signals POSN and POSQ. In accordance with the fine control signal Fine POS and the offset amount, the controller 96 controls the rotary actuator 93.

AS shown in FIG. 11, one period of the position signals POSN and POSQ consists of four tracks T1 to T4. The fine control signal Fine POS is generated by switching the position signals POSN and POSQ from one to the other at each boundary of tracks.

There is a difference between the levels of the signals at the inner and outer tracks of each magnetic disk 90. In this positioning control, the AGC amplifier 94 controls to make the difference at constant value. Each position signal indicates the head position, so that this position signal may lead to a variation in the position detection sensitivity. In this respect, the controller 96 adjusts the control amount of the AGC amplifier 94 to keep the sensitivity of the position signal to a predetermined level.

Conventionally, seeking over four tracks (one period of the position signal) is performed to acquire the position signals POSN and POSQ as shown in FIG. 11. The adjustment value of the AGC amplifier 94 is controlled in such a manner that voltage values at the intersections of the position signals POSN and POSQ become set values V1 and V2. This measurement is carried out at the outermost position and the innermost position of a magnetic disk. The adjustment values for the other tracks are obtained by interpolation of those measured values.

FIG. 12 is an explanatory diagram showing a boundary between tracks, and FIG. 13 is a diagram showing a waveform at the track boundary.

To increase the memory capacity of the magnetic disk apparatus, the track density should be improved. Improving the track density reduces the intervals between tracks. When the offset compensation of the data head is performed, therefore, the servo head 90-2 may be positioned at the boundary between servo tracks T1 and T2 as shown in FIG. 12.

Since this track boundary is where the two position signals POSN and POSQ are switched from one to the other, switching between the position signals POSN and POSQ occurs frequently, as shown in FIG. 12.

As shown in FIG. 13, therefore, the position signals POSN and POSQ fluctuate to thereby vibrate the head. This leads to a positioning error.

SUMMARY OF THE INVENTION

Accordingly, it is an objective of the present invention to provide a position sensitivity adjusting method for a disk apparatus and a disk apparatus using the same, which prevents a head's positioning error even when the track density is increased.

It is another objective of this invention to provide a position sensitivity adjusting method for a disk apparatus and a disk apparatus using the same, which prevents a head's positioning error even when offset compensation is performed.

It is a further objective of this invention to provide a position sensitivity adjusting method for a disk apparatus and a disk apparatus using the same, which prevents a head's positioning error even when a servo head is positioned at a track boundary.

It is a still further objective of this invention to provide a position sensitivity adjusting method for a disk apparatus and a disk apparatus using the same, which prevents the fluctuation of a position signal even when a servo head is positioned at a track boundary.

A disk apparatus according to this invention includes a disk medium having a data surface and a servo surface, a data head for reading a signal on the data surface of the disk medium, a servo head for reading a signal on the servo surface of the disk medium, positioning unit for positioning the data head and the servo head, an AGC amplifier for amplifying a servo signal read by the servo head in accordance with an adjustment value, demodulation means for demodulating an output of the AGC amplifier to two position signals having a phase difference of 90 degrees, and control unit for controlling the positioning unit based on the two position signals and an offset value.

A position sensitivity adjusting method according to this invention comprises a first step of positioning the servo head at a boundary of tracks on the servo surface; a second step of setting a plurality of different adjustment values in the AGC amplifier, reading the two position signals through the servo head for each of the adjustment values, and calculating a dispersion value of the position signals for the each adjustment value; a third step of, based on the calculated dispersion values, acquiring such an adjustment value for the AGC amplifier as to provide a minimum one of the dispersion values; and a fourth step of setting the acquired adjustment value in the AGC amplifier.

According to this invention, the servo head is positioned at a track boundary to directly observe position signals. Then, the dispersion values of the position signals are checked so that the AGC amplifier is so controlled as to provide a minimum dispersion value. As this dispersion indicates how the position signal varies, the position signal with the minimum dispersion value is said to fluctuate less.

Even when the servo head is positioned at a track boundary by offset compensation, therefore, it is possible to reduce a chance for a positioning error.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention.

DETAILED DESCRIPTION OF THE PREFERRED EMBODIMENTS

Figure 1:
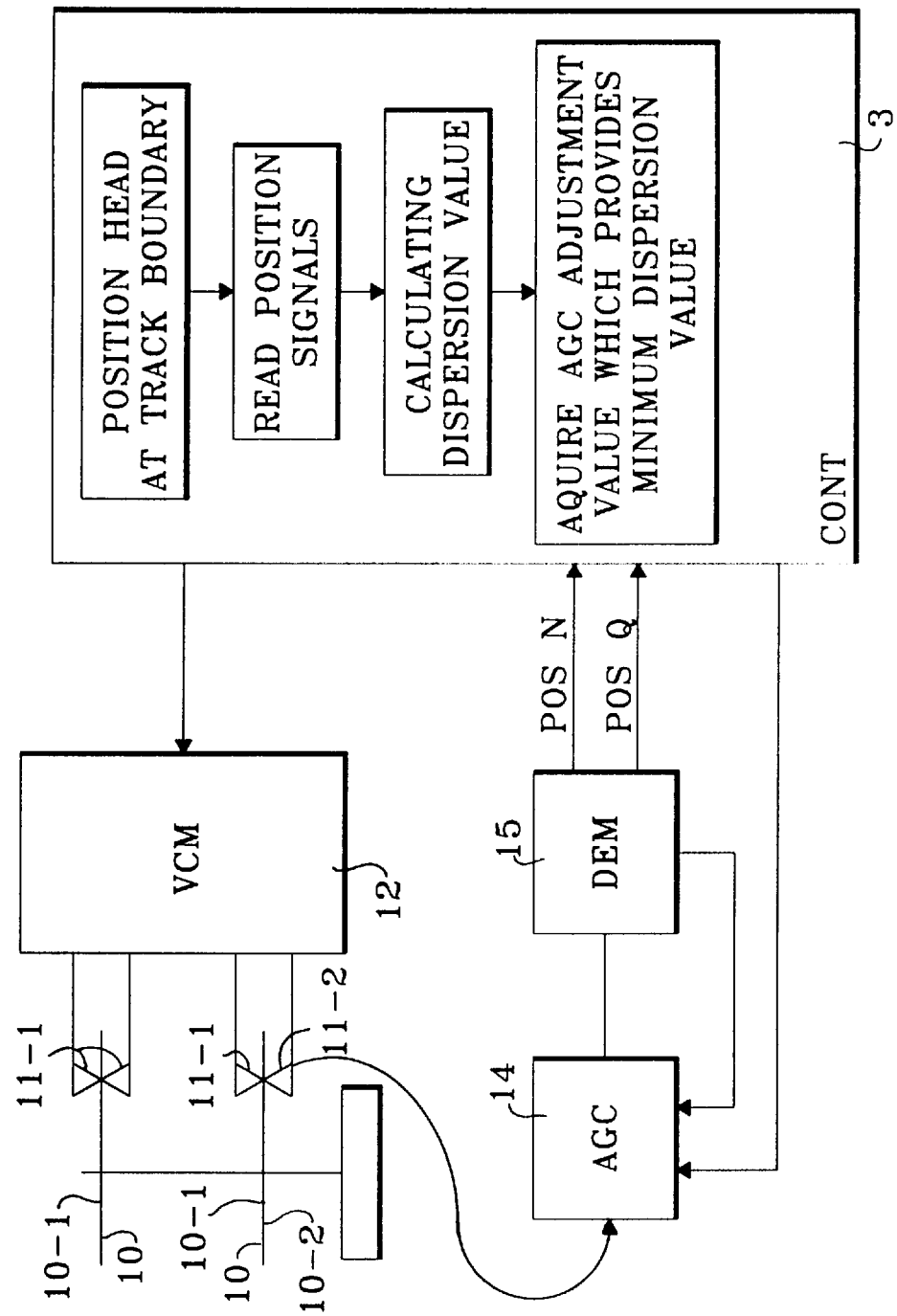
FIG. 1 is a diagram illustrating the principle of this invention.

FIG. 1 illustrates the principle of this invention.

A disk medium 10 has data surfaces 10-1 and a servo surface 10-2. There are data heads 11-1 for reading signals from the data surfaces 10-1 of the disk medium 10 and a servo head 11-2 for reading a signal from the servo face 10-2 of the disk medium 10. A positioning mechanism 12 positions the data heads 11-1 and the servo head 11-2.

An AGC (Automatic Gain Control) amplifier amplifies a servo signal read by the servo head 11-2. A demodulator 15 demodulates the output of the AGC amplifier 14 to two position signals having a phase difference of 90 degrees. A controller 3 controls the positioning mechanism 12 in accordance with the two position signals and an offset value.

The controller 3 first positions the servo head 11-2 at a boundary of tracks on the servo surface 10-2. Then, the controller 3 sets a plurality of different adjustment values in the AGC amplifier 14, and reads two position signals through the servo head 11-2 for each adjustment value. The controller 3 then calculates the dispersion value of the position signals for each adjustment value. The controller 3 acquires the adjustment value for the AGC amplifier which provides the minimum dispersion value, based on the calculated dispersion values, and then sets the acquired adjustment value in the AGC amplifier 14.

Figure 2:
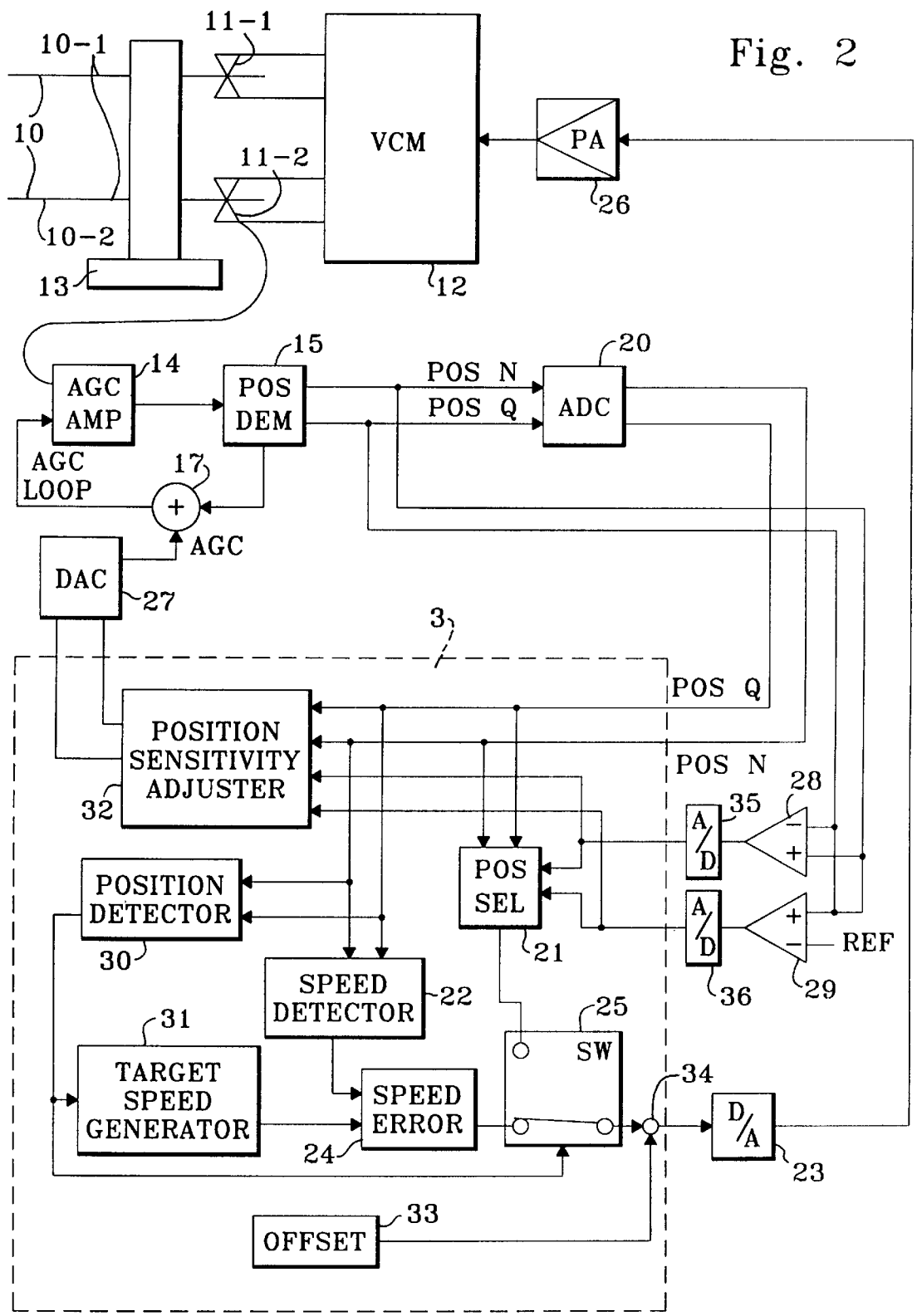
FIG. 2 is a structural diagram showing one embodiment of this invention.

FIG. 2 is a structural diagram showing one embodiment of this invention.

As shown in FIG. 2, two magnetic disks 10 are spun by a spindle motor 13. Of the four sides of the two magnetic disks 10, the three sides are used as data surfaces 10-1 and one side as a servo surface 10-2. A servo signal is written on the servo surface 10-2.

Provided at the data surfaces 10-1 are magnetic heads (data heads) 11-1 which read and write data from and on the respective data surfaces 10-1. Provided at the servo surface 10-2 is a magnetic head (servo head) 11-2 which reads data from the servo surface 10-2. A rotary actuator (voice coil motor) 12 positions those magnetic heads 11-1 and 11-2 at radial positions on the magnetic disks 10.

Figure 11:
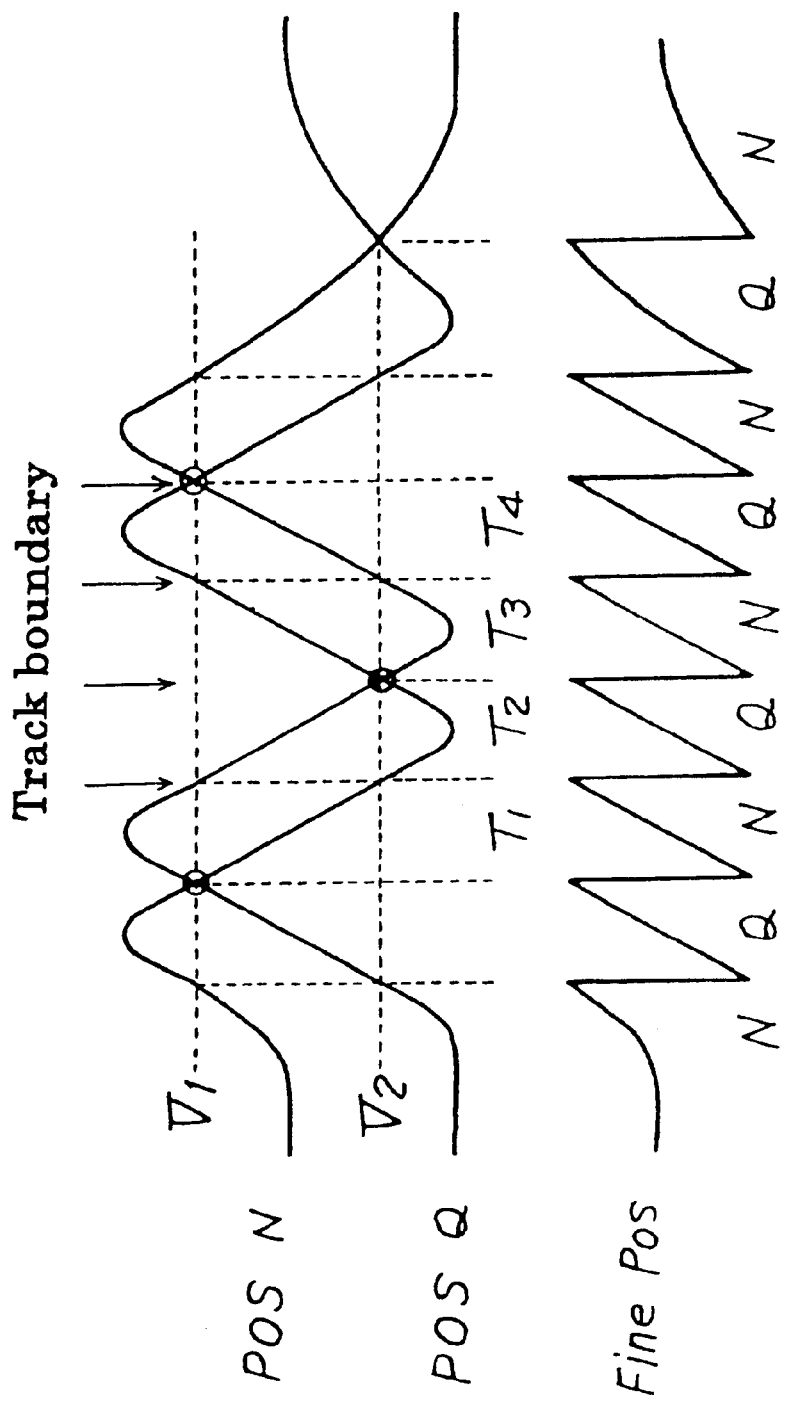
FIG. 11 is an explanatory diagram for a servo signal.
Figure 12:
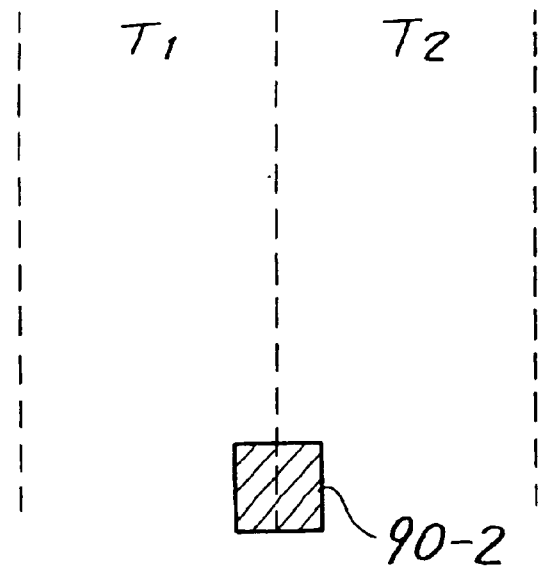
FIG. 12 is an explanatory diagram showing a boundary between tracks in the prior art.
Figure 12:
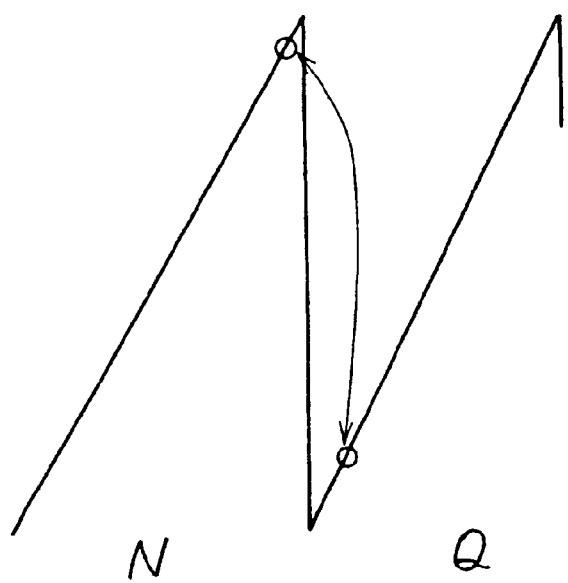
Figure 13:
FIG. 13 is a diagram showing a waveform at the track boundary in the prior art.
Figure 13:

The AGC amplifier 14 performs automatic gain control of signals read by the servo head 11-2 to control the signal levels to a constant level. The demodulator 15 demodulates the output of the AGC amplifier 14 to two position signals POSN and POSQ having a phase difference of 90 degrees. The two position signals POSN and POSQ are sinusoidal waves having a phase difference of 90 degrees as shown in FIG. 11.

An A/D (Analog/Digital) converter 20 converts the position signals POSN and POSQ to digital values. An adder 17 adds a control amount (adjustment amount) from the controller 3 to a control amount from the demodulator 15 to control a reference value (adjustment value) of the AGC amplifier 14.

A D/A (Digital/Analog) converter 27 converts an AGC control value (adjustment value) from the controller to an analog control amount and sends it to the adder 17. A first comparator 28 subtracts the position signal POSQ from the position signal POSN to detect the intersection between both signals. An A/D converter 35 converts the analog output of the first comparator 28 to a digital value.

A second comparator 29 adds the position signal POSN and the position signal POSQ together and subtracts a reference value Ref from the resultant value. An A/D converter 36 converts the analog output of the second comparator 29 to a digital value.

A D/A converter 23 converts a positioning instruction value from the controller 3 to an analog instruction amount. A power amplifier 26 drives the voice coil motor 12 in accordance with this analog amount.

The controller 3 is constituted of a processor which is comprised of a digital signal processor (DSP) and a microprocessor (MPU). The controller 3 comprises the following sections as its functions.

A position signal selector 21 selects the straight portion of the position signal POSN for an even track and the straight portion of the position signal POSQ for an odd track to generate a fine control signal Fine POS shown in FIG. 11. The position signal selector 21 detects the intersection of the position signals POSN and POSQ from the output of the A/D converter 35 and determines whether it is a positive intersection or a negative intersection from the output of the A/D converter 36.

The speed detector 22 takes derivatives of the position signals POSN and POSQ to detect the actual speed. A position detector 30 detects the track position from the position signals POSN and POSQ. A target speed generator 31 generates a target speed according to the detected position.

A speed error generator 24 subtracts the actual speed from the target speed to obtain a speed error. A switching section 25 outputs the speed error in response to a coarse control instruction and outputs the fine control signal Fine POS in response to a fine control instruction.

An offset generator 33 generates an offset value of a track to be sought. An adder 34 adds the output of the switching section 25 and the offset value and sends the resultant value to the D/A converter 23.

As will be discussed later, a position sensitivity adjuster 32 adjusts the position sensitivity of the AGC amplifier 14 from the position signals POSN and POSQ and the outputs of the A/D converters 35 and 36.

Those sections 21-25 and 30-34 are the block representations of programs to be executed by the processor.

The positioning operation (seek operation) of this magnetic disk apparatus will now be described. When receiving a seek command from a high-rank apparatus, the controller 3 executes coarse control. That is, the controller 3 switches the switching section 25 to the coarse control mode. Then, the target speed generator 31 generates a speed curve according to the number of tracks to the target track, which is set in the position detector 30.

Then, the speed detector 22 calculates the actual speed from the position signals POSN and POSQ. The speed error generator 24 obtains a speed error or a speed difference between the target speed on the speed curve and the actual speed. The speed error is sent via the switching section 25 to the D/A converter 23. The output of the D/A converter 23 is given to the power amplifier 26 to thereby drive the rotary actuator 12.

The position detector 30 detects the head position from the position signals POSN and POSQ. When the position detector 30 detects that the head has reached near the target position, the switching section 25 is switched to the fine control mode. Then, the position signal selector 21 generates the fine control signal Fine POS as shown in FIG. 11 from the position signals POSN and POSQ. The adder 34 adds the fine control signal Fine POS and the offset value together, and sends the resultant value to the D/A converter 23. The output of the D/A converter 23 is given to the power amplifier 26 to thereby drive the rotary actuator 12. In this manner, seeking with offset compensation in which the offset value is added to the control value is executed in the fine control mode.

Figure 3:
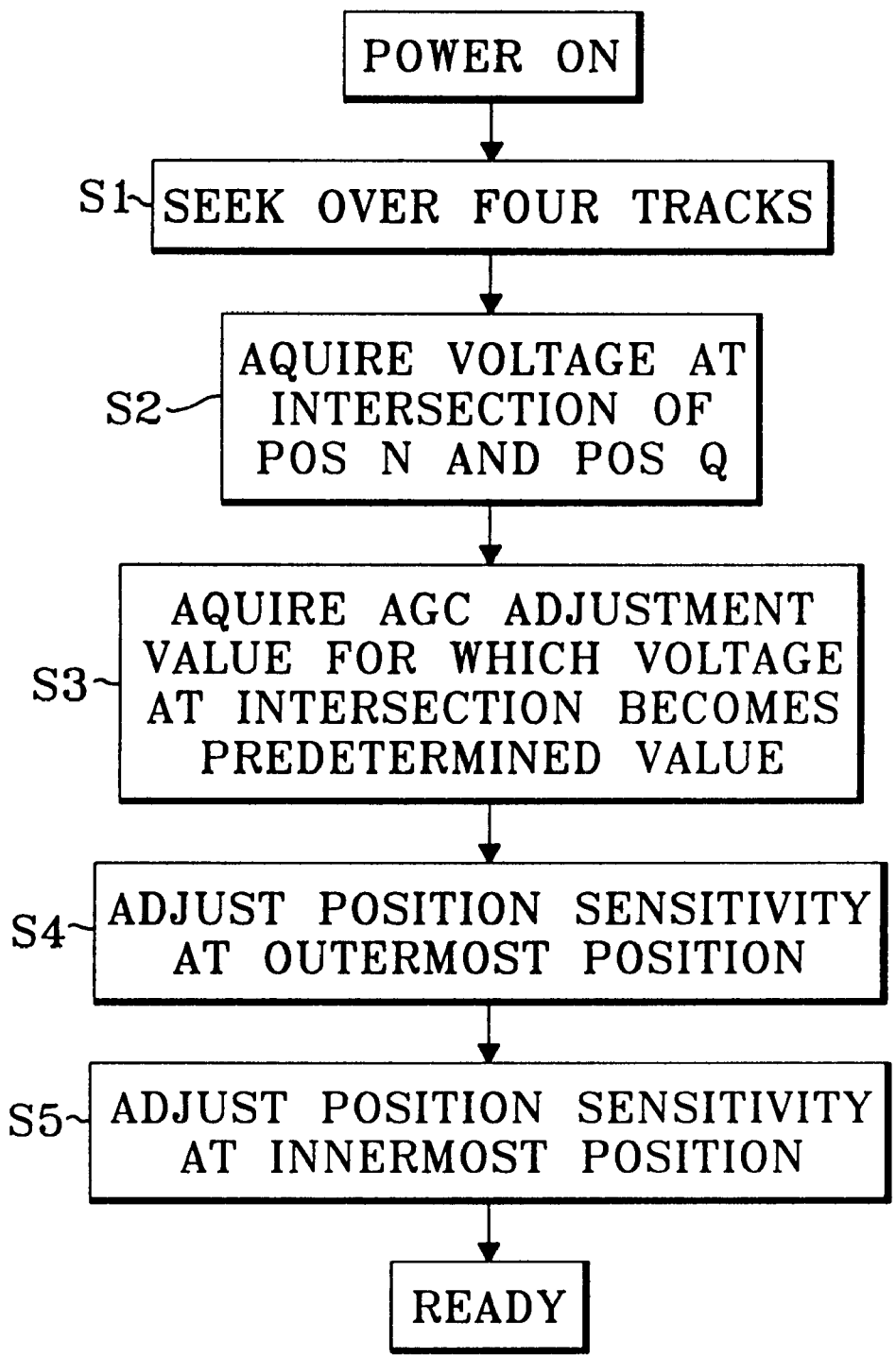
FIG. 3 is a flowchart of the initial process according to this embodiment.
Figure 4:
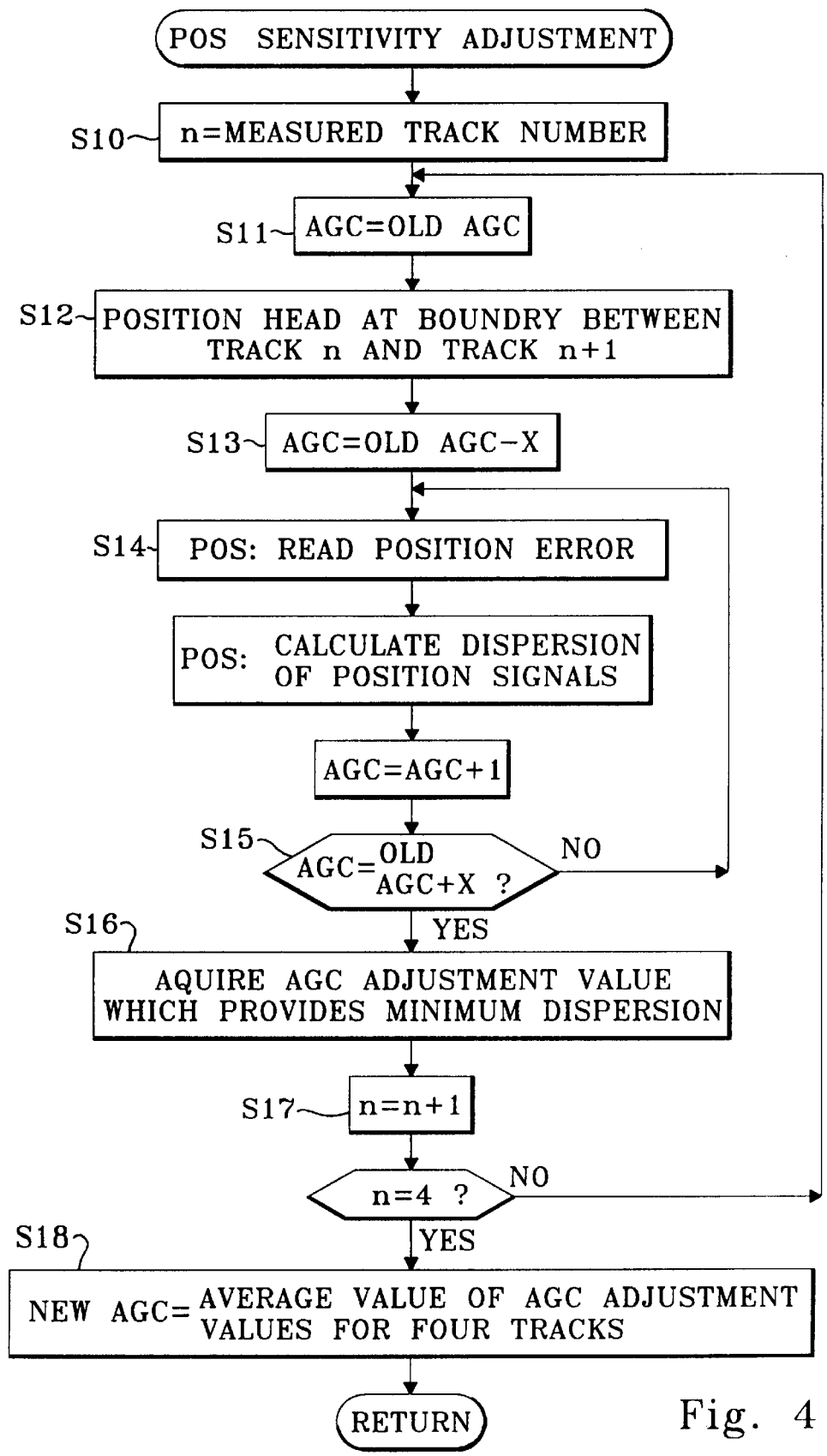
FIG. 4 is a flowchart illustrating a position sensitivity adjusting process in FIG. 3.
Figure 5:
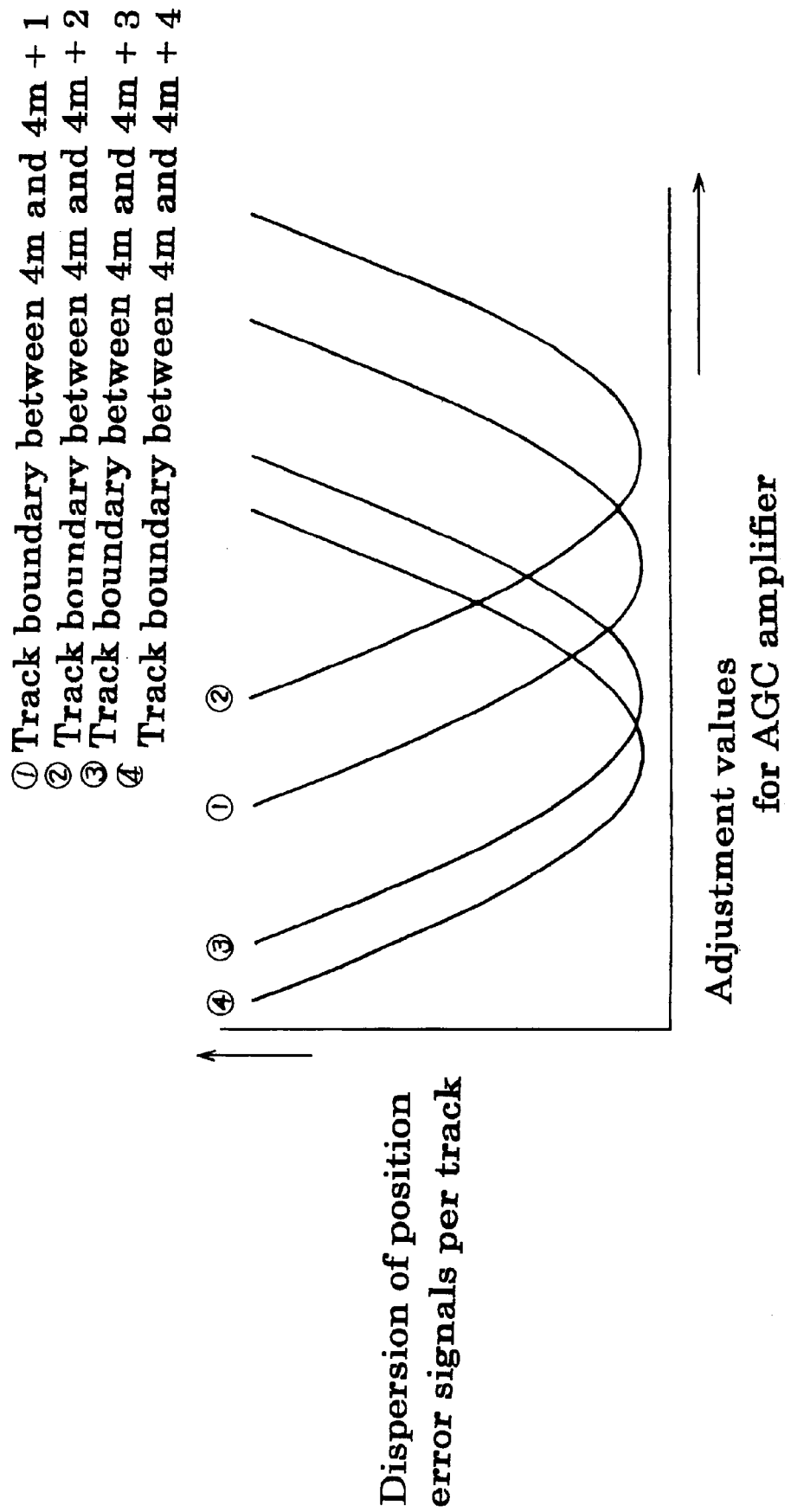
FIG. 5 is an explanatory diagram for the sensitivity adjusting operation in FIG. 4.
Figure 6:
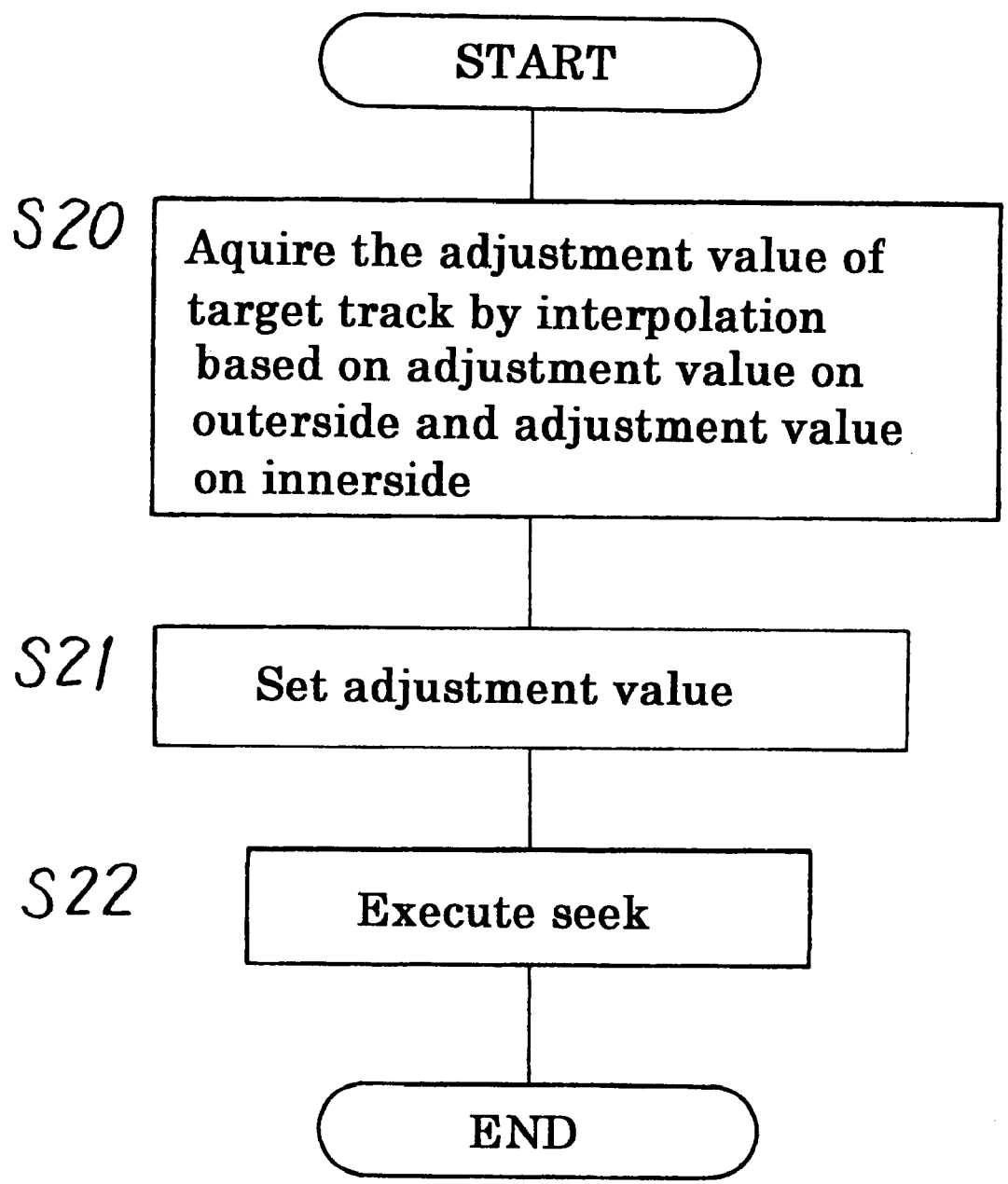
FIG. 6 is a flowchart illustrating a seek process according to this embodiment.
Figure 7:
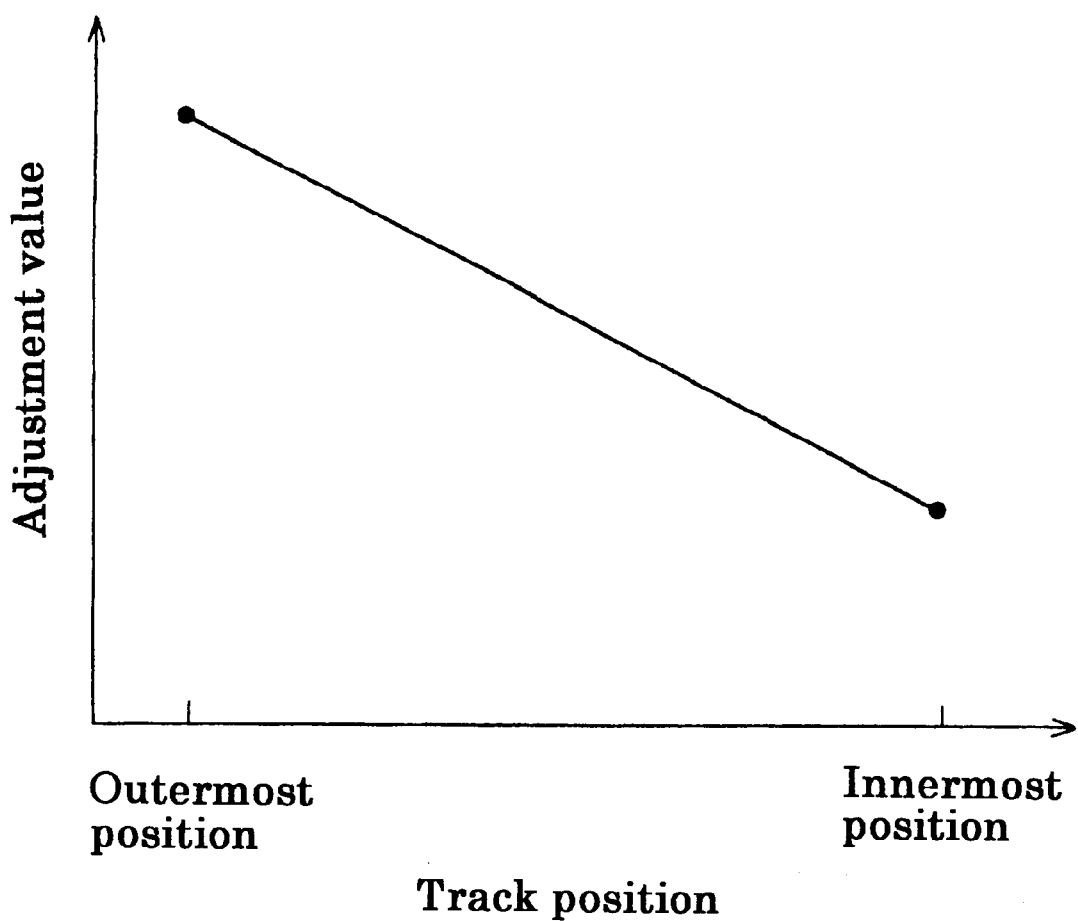
FIG. 7 is an explanatory diagram for an interpolating operation in FIG. 6.

FIG. 3 is a flowchart of the initial process according to this embodiment, FIG. 4 is a flowchart illustrating a position sensitivity adjusting process in FIG. 3, FIG. 5 is an explanatory diagram for the sensitivity adjusting operation, FIG. 6 is a flowchart illustrating a seek process, and FIG. 7 is an explanatory diagram for an interpolating operation.

Referring to FIG. 3, the initial process upon power on will be described.

(S1) After power is given, the controller 3 performs seeking over four tracks at the outermost position on the magnetic disk 10 as in the prior art. That is, seeking of the magnetic head (servo head) over consecutive four tracks is performed. Consequently, the position signals POSN and POSQ for four tracks are obtained as shown in FIG. 11. Likewise, seeking over four tracks at the innermost position is carried out. Consequently, the position signals POSN and POSQ for four tracks are obtained.

(S2) The controller 3 (position sensitivity adjuster 32) acquires the voltages at the intersections of the position signals POSN and POSQ.

(S3) Then, the controller 3 (position sensitivity adjuster 32) acquires the AGC adjustment values for which the voltages at the intersections become a predetermined value. Accordingly, the AGC adjustment value on the outermost side and the AGC adjustment value on the innermost side are obtained.

The controller 3 then memories the AGC adjustment value on the outermost side and the AGC adjustment value on the innermost side.

(S4) Next, the controller 3 (position sensitivity adjuster 32) executes the adjustment of the position sensitivity at a track boundary, which will be discussed later with reference to FIG. 4, at the outermost position using the AGC adjustment value on the outermost side measured in step S3 as the initial value.

(S5) Next, the controller 3 (position sensitivity adjuster 32) executes the adjustment of the position sensitivity at a track boundary, which will be discussed later with reference to FIG. 4, at the innermost position using the AGC adjustment value on the innermost side measured in step S3 as the initial value. As a result, the controller 3 becomes ready for the next operation.

Since it is difficult to position a head at a track boundary without such adjustment of the position sensitivity, AGC is adjusted by the conventional scheme first upon power on.

After an adjustment value is obtained roughly, the position sensitivity at a track boundary is executed. This can ensure smooth adjustment of the position sensitivity at the positioned track boundary.

The process of adjusting the position sensitivity at a track boundary will now be described with reference to FIG. 4.

(S10) The controller 3 sets a measured track number to a track number ⌈n⌋. For the measurement at the outermost position, the measured track number is "0".

(S11) The controller 3 sets the AGC adjustment value to the old AGC adjustment value. This AGC adjustment value is given to the adder 17 via the D/A converter 27 to adjust the AGC amplifier 14.

(S12) The controller 3 positions the servo head at the boundary between a track ⌈n⌋ and a track ⌈n+1⌋. For this positioning, the positioning instruction value is the sum of the positioning value to the track ⌈n⌋ and an offset amount which is a half the track width. Accordingly, positioning with an offset to the boundary at the track ⌈n⌋ and the track ⌈n+1⌋ is performed.

(S13) The controller 3 changes the AGC adjustment value to (old AGC adjustment value−X) where X is a constant value.

(S14) This AGC adjustment value is supplied to the adder 17 via the D/A converter 27 to adjust the AGC amplifier 14. The controller 3 then obtains the position signals POSN and POSQ for one turn of the magnetic disk. Specifically, the position sensitivity adjuster 32 obtains the addition of the position signals POSN and POSQ for one turn of the magnetic disk, via the A/D converter 36.

Further, the position sensitivity adjuster 32 calculates the dispersion value *σ of the position signals for one turn from the following equation.

$$*\sigma = \frac{k\sum_{i=1}^{k} Xi^2 - \left(\sum_{i=1}^{k} Xi\right)^2}{k^2} \quad (1)$$

where K is the number of measured samples and Xi is a measured value of the position signal for each sample.

Then, the controller 3 changes the AGC adjustment value AGC to (AGC +1).

(S15) The controller 3 checks if the AGC adjustment value has reached an upper limit (=old AGC adjustment value+X). When the AGC adjustment value has not reached the upper limit, the controller 3 returns to step S14. When the AGC adjustment value has reached the upper limit, on the other hand, the controller 3 proceeds to step S16.

(S16) As steps S14 and S15 are repeated, the controller 3 acquires the dispersion values of the position signals for the individual AGC adjustment values when each AGC adjustment value is changed to (old AGC adjustment value+X) from (old AGC adjustment value−X), as shown in FIG. 5. From those dispersion values, the controller 3 obtains the AGC adjustment value which provides the minimum dispersion value.

(S17) Then, the controller 3 renews the track number n to (n+1) to position the servo head at the next track boundary. The controller 3 checks if the track number ⌈n⌋ is an upper adjustment track number on the outer side. When the track number ⌈n⌋ is not "4," the controller 3 returns to step S11 to measure the position sensitivity at the next track boundary.

(S18) When the track number ⌈n⌋ is "4," on the other hand, the controller 3 determines that the measurement of the position sensitivity at each of the boundaries of the consecutive four tracks has been completed, as shown in FIG. 5. Accordingly, the controller 3 acquires the average value of the AGC adjustment values at the four track boundaries as a new AGC adjustment value and stores this new AGC adjustment value in the memory. Then, the controller 3 terminates the process.

The AGC adjustment value on the outer side is adjusted in this manner. In other words, the AGC adjustment values at the boundaries of four tracks with track numbers 0000h to 0003h on the outer side. Then, the average value of those AGC adjustment values is stored.

The same process is likewise performed on the innermost side to acquire and store the AGC adjustment values on the inner side. In this case, the upper track number "4" on the outer side should be changed to the upper track number on the inner side in step S17.

A seek process using those adjustment values will now be discussed with reference to FIGS. 6 and 7.

(S20) In executing the seek process, the controller 3 calculates the adjustment value of the target track by interpolation based on the adjustment value on the outer side and the adjustment value on the inner side.

(S21) The controller 3 sends this adjustment value to the adder 17 via the D/A converter 27 to control the AGC amplifier 14.

(S22) Then, the controller 3 executes the actual seek process.

As apparent from the above, the adjustment values of other tracks are obtained by performing interpolation based on the stored adjustment values on the outer side and the inner side.

Further, at the time of calibration after a given time, the AGC position sensitivities at the outermost position and the innermost position are adjusted to update the adjustment values.

As described above, the servo head is positioned at each track boundary and the AGC adjustment value which minimizes the dispersion value of the position signals is obtained. Even if the servo head is positioned at a track boundary by offset compensation, therefore, a probable fluctuation of the position signal becomes smaller. Even when the intervals between tracks are narrowed, a possible occurrence of a positioning error can be reduced.

As the adjustment value is altered between both sides of the old adjustment value, i.e., between the (old adjustment value−X) to the (old adjustment value+X), it is easier to find the adjustment value which provides the minimum dispersion value.

As the adjustment values on the inner side and outer side are measured and the adjustment values of the other tracks are obtained by interpolation, the measuring time can be shortened. What is more, it is possible to reduce the memory capacity for storing the adjustment values.

The AGC adjustment value which minimizes the dispersion value of the position signals is obtained at each of consecutive four tracks 4m, 4m+1, 4m+2 and 4m+3. As apparent from FIG. 5, the adjustment values for those consecutive four tracks differ from one another. This is because the position signals POSN and POSQ complete one period over four tracks, so that the usable portions of the position signals POSN and POSQ vary track by track over those four tracks. If the inclinations of those different portions vary slightly, the adjustment values of the AGC amplifier 14 are set differently.

In this example, because the average value of the adjustment values over consecutive four tracks is obtained, the memory capacity for storing the adjustment values can be reduced and the interpolation computation in the seek process becomes easier.

After the measured adjustment value is set in the AGC amplifier 14, positioning at a track boundary is performed again and the dispersion value of the position signals is calculated. Then, the AGC adjustment value which provides the minimum dispersion value is obtained. When this AGC adjustment value is greater than a predetermined value, it is determined that some abnormality has occurred and such may be reported to a high-rank apparatus.

At the time of the aforementioned calibration after a given time, the AGC adjustment value may be measured on either the outer side or the inner side. This scheme can shorten the adjusting time at the calibration time.

Further, the AGC adjustment values for the individual tracks may previously be computed through interpolation and may be stored in the memory. At the time of seeking each track in this case, the AGC adjustment value for that track can be read from the memory.

Figure 8:
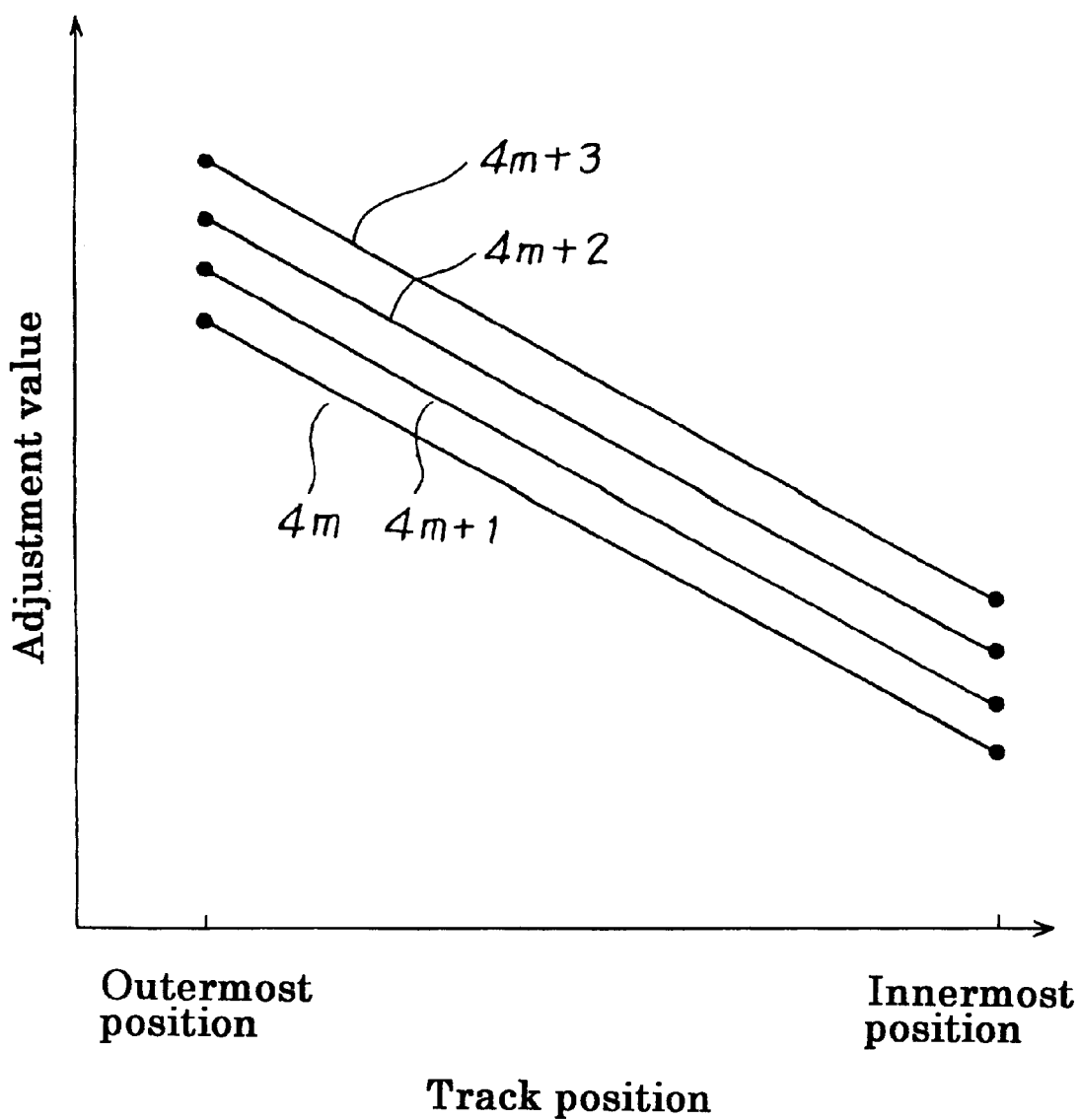
FIG. 8 is an explanatory diagram for a sensitivity adjusting operation according to the second embodiment of this invention.

FIG. 8 presents an explanatory diagram for a sensitivity adjusting operation according to the second embodiment of this invention.

In the above-described first embodiment, the average value of the AGC adjustment values which minimizes the dispersion values of the position signals at consecutive four tracks 4m, 4m+1, 4m+2 and 4m+3 is treated as the adjustment value.

However, the AGC adjustment values which minimizes the dispersion values of the position signals at the consecutive four tracks 4m, 4m+1, 4m+2 and 4m+3 differ from one another as shown in FIG. 5. This is because, as mentioned above, the position signals POSN and POSQ complete one period over four tracks, so that the usable portions of the position signals POSN and POSQ vary track by track over those four tracks. If the inclinations of those different portions vary slightly, the adjustment values of the AGC amplifier 14 are set differently.

In the second embodiment, the average value is not obtained. The AGC adjustment values at the consecutive four tracks 4m, 4m+1, 4m+2 and 4m+3 at the innermost position and at the outermost position are stored in the memory. The AGC adjustment value of each track is then acquired by interpolation. For example, an AGC adjustment values for a track with a track number "4m" (0, 4, 8, . . . ) is calculated by the interpolation of the AGC adjustment values measured at the tracks 4m at the innermost position and the outermost position. This scheme can allow the AGC adjustment values to be obtained more accurately.

Figure 9:
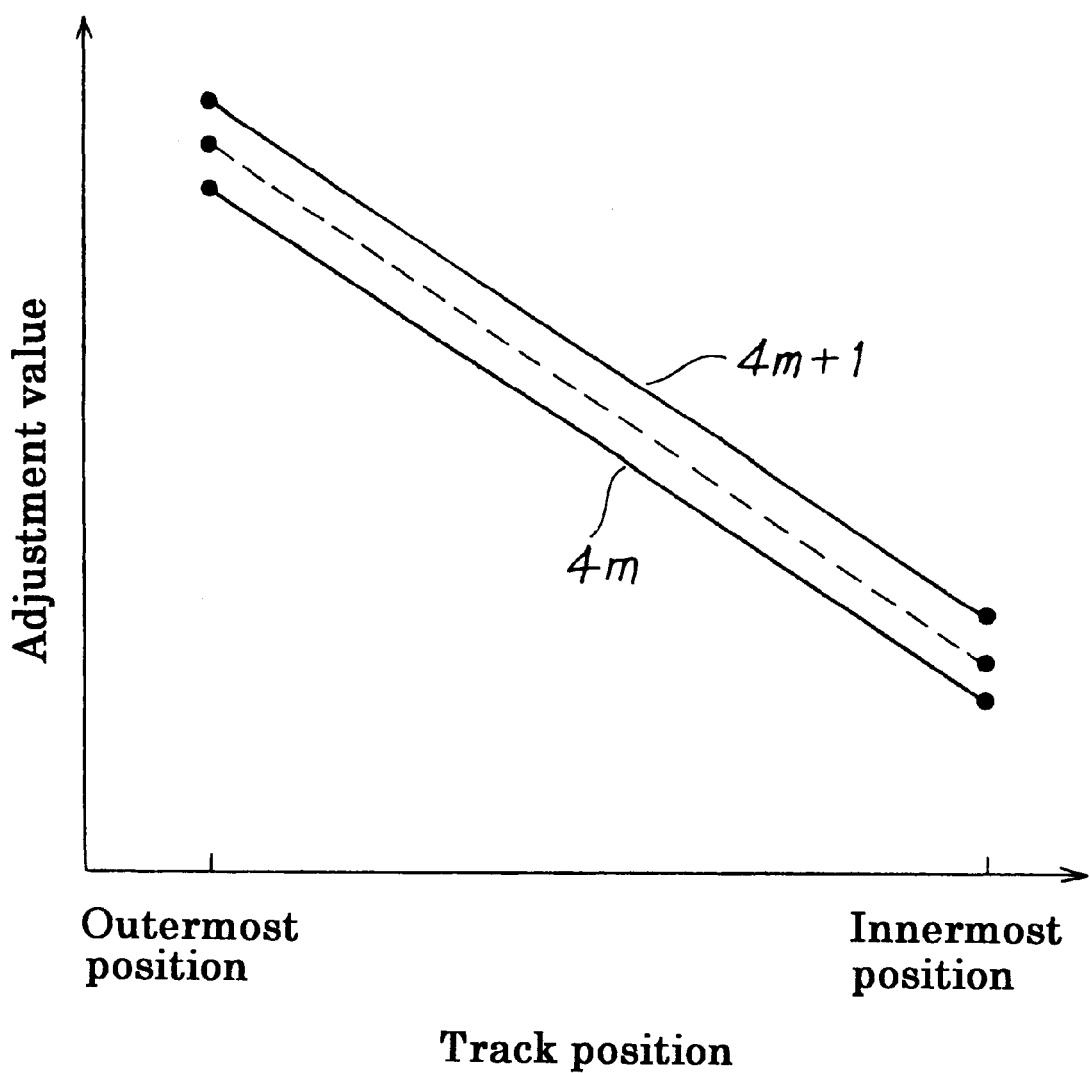
FIG. 9 is an explanatory diagram for a sensitivity adjusting operation according to the third embodiment of this invention.
Figure 10:
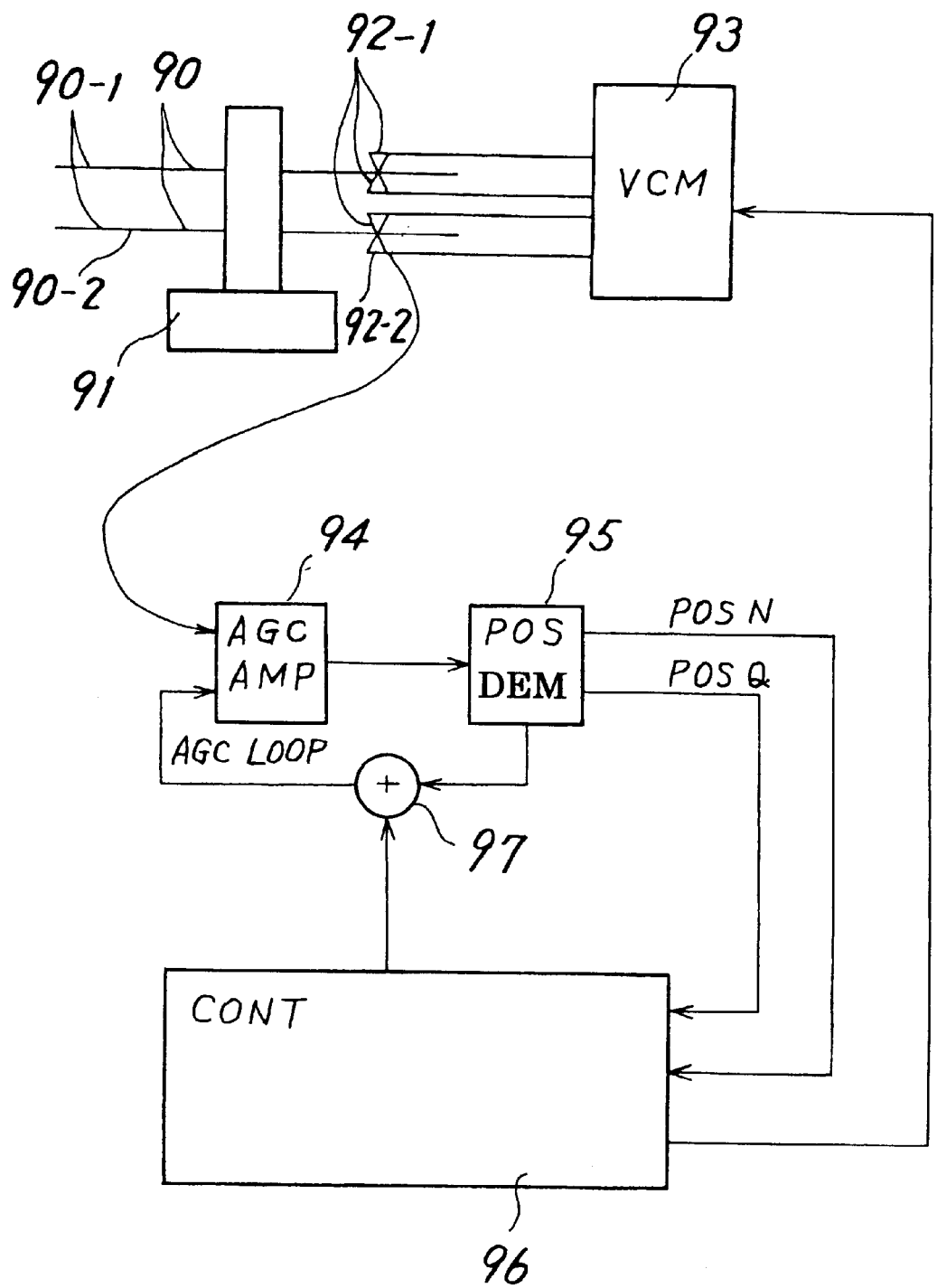
FIG. 10 is a structural diagram of prior art.

FIG. 9 presents an explanatory diagram for a sensitivity adjusting operation according to the third embodiment of this invention.

In the above-described first embodiment, the average value of the AGC adjustment values which minimizes the dispersion values of the position signals at consecutive four tracks 4m, 4m+1, 4m+2 and 4m+3 is treated as the adjustment value.

The AGC adjustment values for the track boundaries of tracks 4m and 4m+2 whose track numbers when divided by "4" leave the remainders of "0" and "2" respectively show the same tendency. Likewise, the AGC adjustment values for the track boundaries of tracks 4m+1 and 4m+3 whose track numbers when divided by "4" leave the remainders of "1" and "3" respectively show the same tendency.

In consideration of the above, AGC adjustment values are measured at the track boundary of the track with the track number 4m and at the track boundary of the track with the track number 4m+1. That is, the measurement of AGC adjustment values at the track boundary of the track with the track number 4m+2 and at the track boundary of the track with the track number 4m+3 is omitted.

Then, the average value of the AGC adjustment value measured at the track boundary of the track with the track number 4m and the AGC adjustment value measured at the track boundary of the track with the track number 4m+1, as indicated by the broken line in FIG. 9, is stored as the AGC adjustment value for the tracks with the track numbers 4m, 4m+1, 4m+2 and 4m+3. For the other tracks, the AGC adjustment values are similarly obtained by interpolation.

This scheme can further shorten the measuring time.

Besides the above-described embodiments, this invention may be embodied in the following forms.

First, although the AGC position sensitivity is measured at the outermost position and the innermost position and the position sensitivities for the other tracks are acquired through interpolation in the above-described embodiments, the AGC position sensitivity for every track may be measured and stored in the memory.

Secondly, the measurement for every track may be executed only when power is given. Further, the measurement for every track may be executed when calibration is performed every given time.

Thirdly, after measuring position sensitivities for the entire tracks, a difference between the AGC adjustment values for adjoining tracks may be computed and the computation result, if it is equal to or greater than a predetermined value, may be reported as the occurrence of an abnormality to a high-rank apparatus. Likewise, a difference between the AGC adjustment values at the outermost track and the innermost track may be computed and the computation result, if it is equal to or greater than a predetermined value, may be reported as the occurrence of an abnormality to the high-rank apparatus.

Fourthly, a difference between the previous adjustment value and the current adjustment value may be computed and the computation result, if it is equal to or greater than a predetermined value, may be reported as the occurrence of an abnormality to the high-rank apparatus. Fifth, although a disk has a servo surface in the embodiments, this invention is also applicable for a disk not having a survo surface, for example, a disk having a data surface which has a data track embedded with servo data. In this disk, when the read head is comprised of a magnetorestive head, read operational is performed with an offset. This invention is applicable in such a system.

Although only two embodiments of the present invention have been described herein, it should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

As apparent from the above, this invention has the following advantages.

The servo head is positioned at a track boundary to directly observe position signals. The dispersion value of the position signals is checked and the AGC amplifier is adjusted in such a way as to minimize the dispersion value. Even when the servo head is positioned at a track boundary by offset compensation, therefore, a probable vibration of the head can be reduced. This can reduce a probable occurrence of a positioning error even when the servo head is positioned at a track boundary by offset compensation.

What is claimed is:

1. A position sensitivity adjusting method for a disk apparatus including a disk medium having a data surface and a servo surface, a data head for reading a signal on said data surface of said disk medium, a servo head for reading a signal on said servo surface of said disk medium, positioning means for positioning said data head and said servo head, an automatic gain control amplifier for amplifying a servo signal read by said servo head in accordance with an adjustment value, demodulation means for demodulating an output of said automatic gain control amplifier to two position signals having a phase difference of 90 degrees, and control means for controlling said positioning means based on said two position signals and an offset value, said method comprising:

a first step of positioning said servo head at a boundary of tracks on said servo surface;

a second step of setting a plurality of different adjustment values in said automatic gain control amplifier, reading said two position signals through said servo head for each of said adjustment values, and calculating a dispersion value of said position signals for said each adjustment value;

a third step of, based on said calculated dispersion values, acquiring such an adjustment value for said automatic gain control amplifier as to provide a minimum one of said dispersion values; and a fourth step of setting said acquired adjustment value in said automatic gain control amplifier.

2. The position sensitivity adjusting method according to claim 1, wherein said second step includes a step of calculating a dispersion value of a sum of said two position signals.

3. The position sensitivity adjusting method according to claim 1, further comprising a fifth step, before said first step, for adjusting an initial adjustment value for said automatic gain control amplifier in such a manner that a voltage value at an intersection of said two position signals acquired by moving said servo head over a plurality of at least consecutive tracks for a seek operation becomes a predetermined value.

4. The position sensitivity adjusting method according to claim 1, wherein said first step positions said servo head at individual boundaries associated with consecutive four tracks; and said second and said third steps acquire four adjustment values at said individual boundaries.

5. The position sensitivity adjusting method according to claim 4, wherein said third step includes a step of acquiring an average value of said four adjustment values obtained at said individual boundaries; and said fourth step includes a step of setting said acquired average value as an adjustment value.

6. The position sensitivity adjusting method according to claim 4, wherein said third step includes a step of storing said four adjustment values obtained at said individual boundaries; and said fourth step includes a step of selecting said four adjustment values in accordance with track positions corresponding said four tracks.

7. The position sensitivity adjusting method according to claim 1, wherein said first step positions said servo head at individual boundaries associated with first and second tracks;

said second and third steps acquire adjustment values at said individual boundaries; and said fourth step includes a step of calculating adjustment values for individual tracks from said adjustment values obtained at said individual boundaries.

8. The position sensitivity adjusting method according to claim 1, wherein said first step positions said servo head at an outermost track boundary and an innermost track boundary of said disk medium.

9. The position sensitivity adjusting method according to claim 1, wherein said first step positions said servo head at individual boundaries of entire tracks of said disk medium; and said third step acquires adjustment values at said individual boundaries.

10. A position sensitivity adjusting method for a disk apparatus including a disk medium, a head for reading a signal on said disk medium, positioning means for positioning said head, an automatic gain control amplifier for amplifying a servo signal read by said head in accordance with an adjustment value, demodulation means for demodulating an output of said automatic gain control amplifier to two position signals having a phase difference of 90 degrees, and control means for controlling said positioning means based on said two position signals and an offset value, said method comprising:

a first step of positioning said head at a boundary of tracks on said disk medium;

a second step of setting a plurality of different adjustment values in said automatic gain control amplifier, reading said two position signals through said head for each of said adjustment values, and calculating a dispersion value of said position signals for said each adjustment value;

a third step of, based on said calculated dispersion values, acquiring such an adjustment value for said automatic gain control amplifier as to provide a minimum one of said dispersion values; and a fourth step of setting said acquired adjustment value in said automatic gain control amplifier.

11. The position sensitivity adjusting method according to claim 10, wherein said second step includes a step of calculating a dispersion value of a sum of said two position signals.

12. A disk apparatus including:

a disk medium having a data surface and a servo surface;

a data head for reading a signal on said data surface of said disk medium;

a servo head for reading a signal on said servo surface of said disk medium;

positioning means for positioning said data head and said servo head;

an automatic gain control amplifier for amplifying a servo signal read by said servo head in accordance with an adjustment value;

demodulation means for demodulating an output of said automatic gain control amplifier to two position signals having a phase difference of 90 degrees; and control means for controlling said positioning means based on said two position signals and an offset value;

wherein said control means position said servo head at a boundary of tracks on said servo surface, set a plurality of different adjustment values in said automatic gain control amplifier, read said two position signals through said servo head for each of said adjustment values, calculate a dispersion value of said position signals for said each adjustment value, and set an adjustment value for said automatic gain control amplifier as to provide a minimum one of said dispersion values.

13. The disk apparatus according to claim 12, wherein said control means calculate a dispersion value of a sum of said two position signals.

14. A disk apparatus including:

a disk medium;

a head for reading a signal on said disk medium;

positioning means for positioning said head;

an automatic gain control amplifier for amplifying a servo signal read by said head in accordance with an adjustment value;

demodulation means for demodulating an output of said automatic gain control amplifier to two position signals having a phase difference of 90 degrees; and control means for controlling said positioning means based on said two position signals and an offset value;

wherein said control means position said servo head at a boundary of tracks on said disk medium, set a plurality of different adjustment values in said automatic gain control amplifier, read said two position signals through said head for each of said adjustment values, calculate a dispersion value of said position signals for said each adjustment value, and set an adjustment value for said automatic gain control amplifier as to provide a minimum one of said dispersion values.

15. The disk apparatus according to claim 14, wherein said control means calculate a dispersion value of a sum of said two position signals.

* * * * *

UNITED STATES PATENT AND TRADEMARK OFFICE
CERTIFICATE OF CORRECTION

PATENT NO. : 5,907,449
DATED : May 25, 1999
INVENTOR(S) : Itou et al.

It is certified that error appears in the above-identified patent and that said Letters Patent is hereby corrected as shown below:

ON THE TITLE PAGE:

Under "[54]" please delete "SUNSITIVITY"

and insert --SENSITIVITY-- therefor

Signed and Sealed this

Twenty-seventh Day of March, 2001

NICHOLAS P. GODICI

Attest:

Attesting Officer

Acting Director of the United States Patent and Trademark Office